A. H. HARRIS.
COLLAPSIBLE CORE.
APPLICATION FILED JUNE 27, 1918.
1,343,504. Patented June 15, 1920.
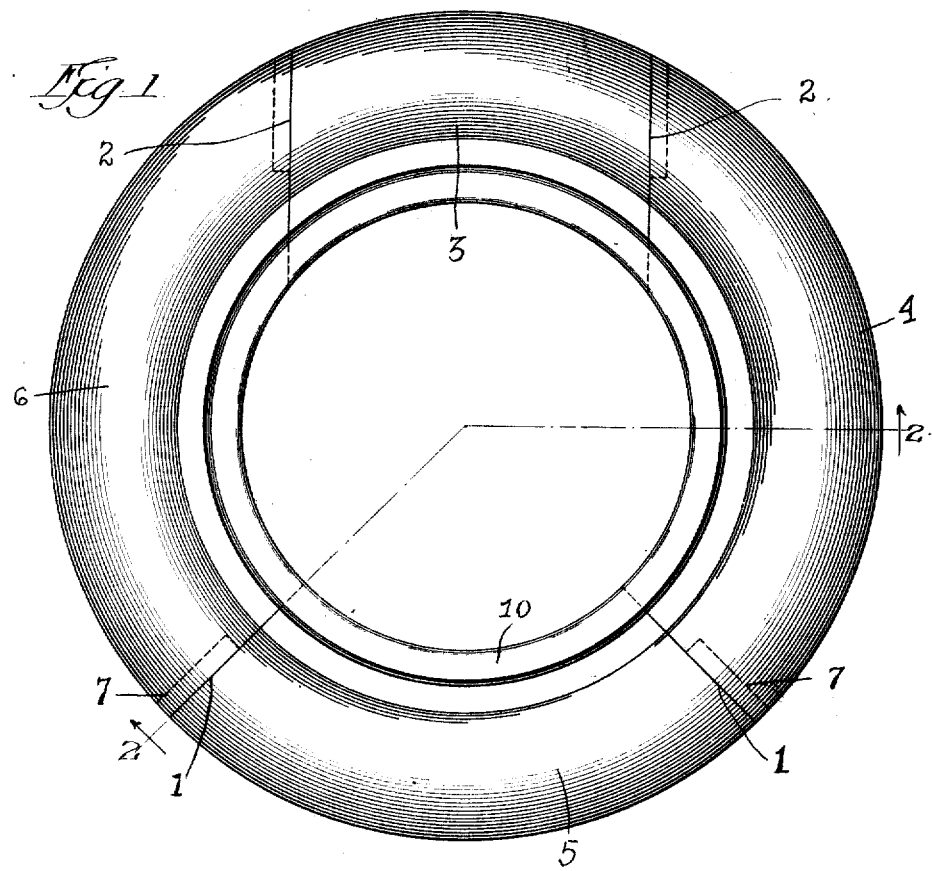
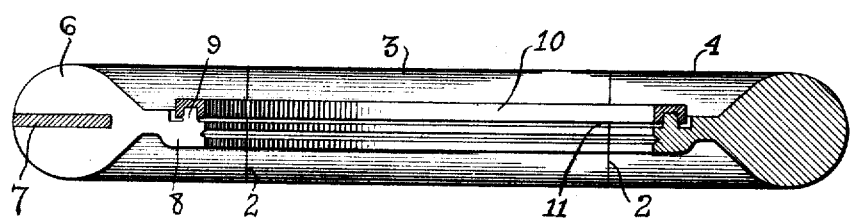
Witness:
Inventor
Archer H. Harris

UNITED STATES PATENT OFFICE.

ARCHER H. HARRIS, OF BARBERTON, OHIO.

COLLAPSIBLE CORE.

1,343,504.	Specification of Letters Patent.	Patented June 15, 1920.

Application filed June 27, 1918. Serial No. 242,205.

*To all whom it may concern:*

Be it known that I, ARCHER H. HARRIS, a citizen of the United States, residing at Barberton, in the county of Summit, State of Ohio, have invented certain new and useful Improvements in Collapsible Cores, of which the following is a specification.

This invention relates to a form of collapsible core for use in the manufacture of automobile tires, which cores are designed to be taken apart for removal from the casing after vulcanization. It is the purpose of the invention to construct a core which shall be easy to collapse and reassemble without the use of screws or bolts, making use of a solid ring which may be easily fitted onto the core and will maintain the core assembled and may be easily removed.

Figure 1 is a plan view of a core in assembled position.

Fig. 2 is a cross section on the line 2—2 of Fig. 1.

The core is made into any suitable number of parts, preferably four, being divided along radial lines 1 and along tangental lines 2 so that the part 3 may first be removed inwardly of the tire and then the parts 4, 5 and 6. Between the parts there is provided a tongue and groove connection 7. This construction is common to all collapsible tire cores.

On all sections of the core there is formed the tongue 8 each part of which carries a lateral rib or projection 9 spaced from the inner edge thereof, over which is adapted to be placed the continuous ring 10 which serves to hold the core sections in place by means of a groove or channel on its under side which mates with ribs. The rib 9 is tapered outwardly from the core at an angle small enough so that the ring will be held in place by the wedging action of the two surfaces without the necessity of providing bolts, screws or other mechanical fastening to hold it in place. This is preferably an angle of 1½°, although the angle may be made greater or less if found practicable. The ring 10 may, therefore, be called a friction ring as it holds the core together by friction alone, the core after being assembled, being held together without any mechanical fastening whatever. Between the lower inside edge of the ring and tongue there is a narrow space 11 into which a lever may be inserted for the purpose of prying off the ring.

The core designed by me is easily operated and presents advantages over cores in use at the present time. It is not desired that the invention herein be limited to the details shown, as it is possible to make alterations within the scope of the claims without sacrificing any of the benefits of the invention.

I claim:

1. A core composed of a plurality of separable segments, a tapered projection on each segment, and a one piece ring adapted to fit over the projections to hold the segments of the core together, the underside of said ring having a tapered groove to fit the projections, the taper of the projections and ring being such that the parts may be held together by friction alone without rotation of the ring.

2. A core composed of a plurality of separable segments, a tongue on each segment, a projection on each tongue, a solid ring adapted to fit over the projections to hold the segments of the core together, the underside of said ring having an endless groove to fit the projections, the groove and projections being correspondingly tapered at an angle such that the parts may be held together by friction alone.

3. A core composed of a plurality of separable segments, a tongue on each segment, a rib on each tongue, the ribs when brought together forming a complete circle, a ring having a groove to fit the circular rib, the groove and the rib being correspondingly tapered at an angle such that the parts are held together by friction alone, a space being provided between the rib and the core serving as a purchase for a lever for removing the ring.

4. A core composed of a plurality of separable segments, a tongue on each segment, a rib on each tongue spaced outwardly from the inner edge thereof, the ribs when brought together forming a complete circle, a ring provided with a groove on its underside to fit the rib, the groove and the rib being correspondingly tapered at an angle such that the parts are held together by friction alone, the lower edge of the ring being spaced from the tongue of the core to provide a space serving as a purchase for a lever for removing the ring.

5. A core comprising a plurality of separable segments, a lateral projection on each segment, a friction ring adapted to fit over said projections and provided with a circular groove, the said projections having surfaces which converge, and the said groove being provided with surfaces which fit over the converging surfaces on said projections to hold said core in assembled relation.

6. A core comprising a plurality of separable segments, lateral projections on the segments located on one side of said core only, a single ring provided with a channel on one of its plane surfaces, the sides of the projections converging, and the sides of the groove being adapted to fit over the projections and maintain the core in assembled relation without being mechanically fastened thereto.

7. A core comprising a plurality of separable segments, a lateral rib on each segment, the ribs being in the form of arcs of the same circle, a channel ring having a channel on one of its flat sides concentric with the ribs when the core is in assembled condition, the sides of the ribs and the sides of the channel converging at such an angle that when assembled the core will be held together without being mechanically fastened.

ARCHER H. HARRIS.